United States Patent [19]

Berman et al.

[11] Patent Number: 4,516,950

[45] Date of Patent: May 14, 1985

[54] SPEAKING TOY EMPLOYING CHORDIC INPUT

[75] Inventors: Oded Berman, Tel Aviv; Zohar Eilam, Ramat Aviv; Zeev B. Itzchak, Haifa, all of Israel

[73] Assignee: Ergoplic Ltd., An Israel Company, Kiron, Israel

[21] Appl. No.: 343,373

[22] Filed: Jan. 27, 1982

[51] Int. Cl.³ .............................................. A63H 33/26
[52] U.S. Cl. .................................... 446/297; 446/299; 446/327
[58] Field of Search .............. 46/232, 210; 179/1 SM, 179/1 SP; 446/299, 297

[56] References Cited

U.S. PATENT DOCUMENTS

| | | | |
|---|---|---|---|
| 3,685,200 | 8/1972 | Noll | 46/232 |
| 4,032,897 | 6/1977 | Pooley | 179/1 SP |
| 4,042,777 | 8/1977 | Bequaert et al. | 178/79 |
| 4,224,762 | 9/1980 | McCaslin | 46/210 |
| 4,357,489 | 11/1982 | Henderson et al. | 179/1 SM |
| 4,363,181 | 12/1982 | Hyman et al. | 46/232 |

Primary Examiner—Robert A. Hafer
Assistant Examiner—Bradley M. Lewis
Attorney, Agent, or Firm—Browdy and Neimark

[57] ABSTRACT

A toy including apparatus for producing a desired sequence of sounds and chordic keyboard apparatus for operating same. The desired sequence of sounds may be human speech, music or any other desired sequence of sounds. In a preferred embodiment of the invention a talking doll is provided.

16 Claims, 8 Drawing Figures

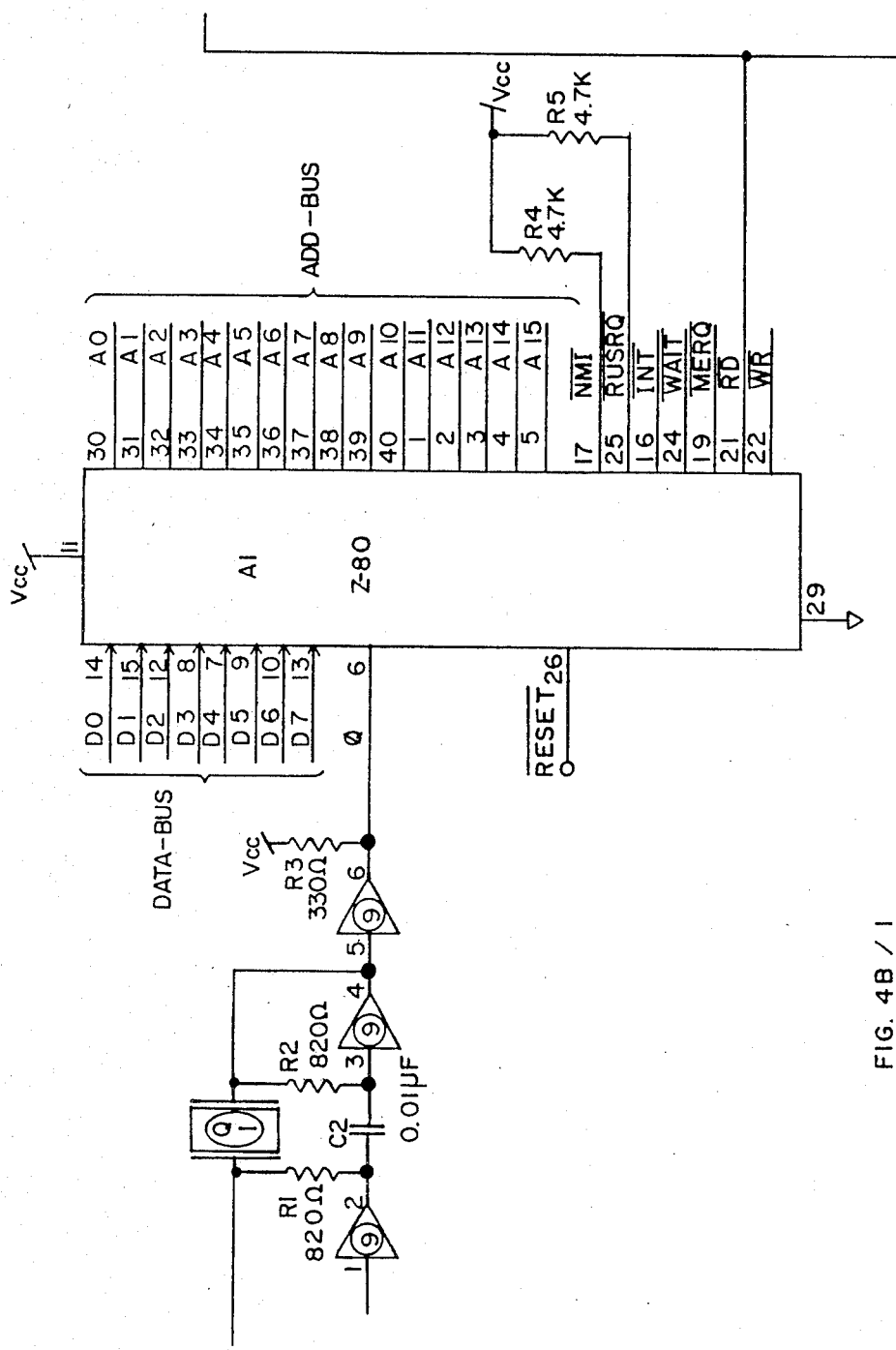
FIG. 4B/1

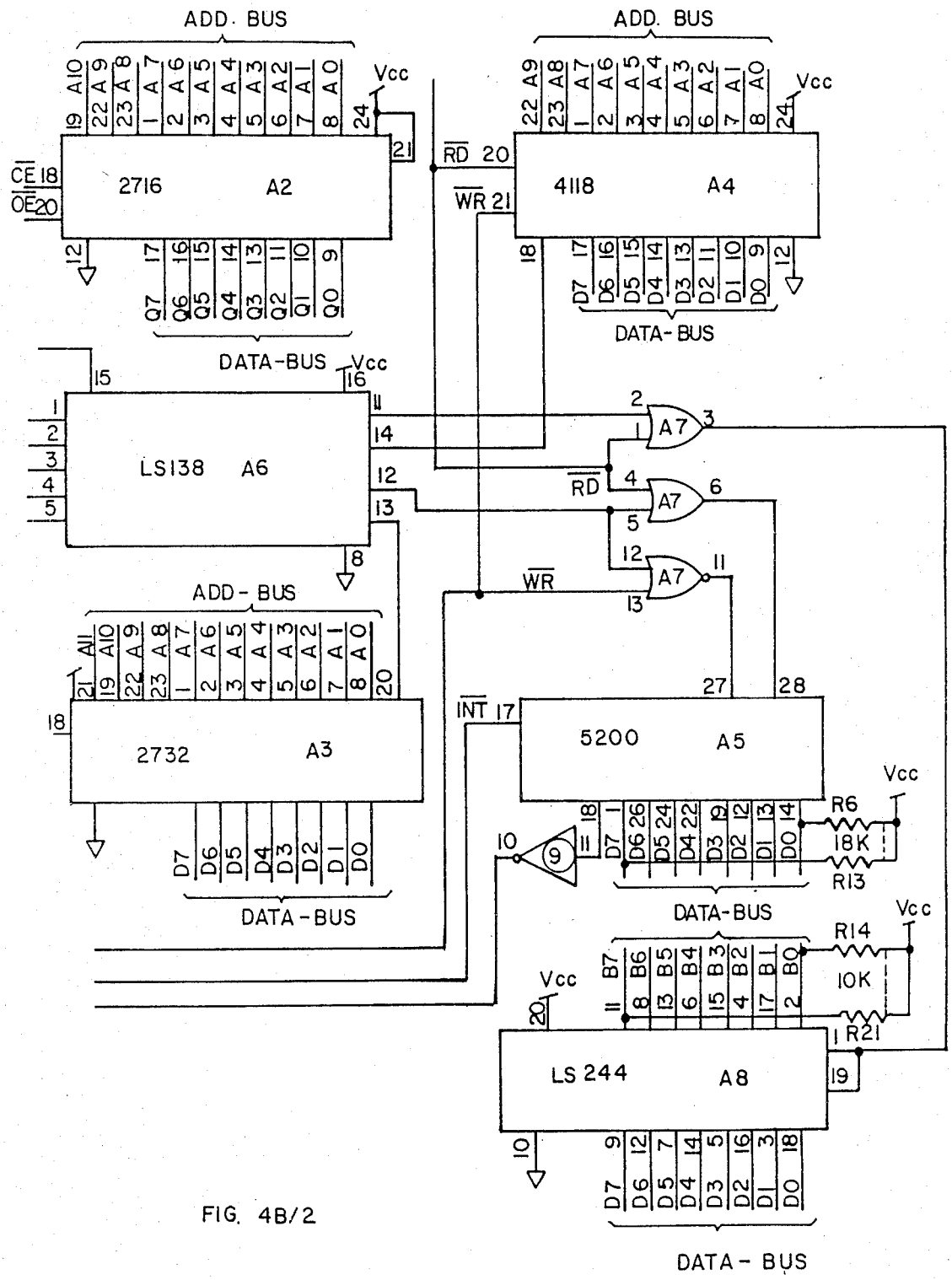
FIG. 4B/2

SPEAKING TOY EMPLOYING CHORDIC INPUT

FIELD OF THE INVENTION

The present invention relates to toys and more particularly to toys having a speaking function or producing a desired audio output.

BACKGROUND OF THE INVENTION

With the advent of the speech synthesizer, toys having a speaking function have appeared on the market. These toys are normally actuated by switches, such as push buttons, on a one-to-one basis, that is, each switch actuates a single letter or symbol. Thus toys have been proposed which incorporate a full size keyboard for providing instructions for a speech output. Such keyboards require two handed operation and are extremely expensive. They are clearly not applicable to portable toys.

Chordic keyboards are known in the patent literature. Examples of such keyboards are described in U.K. Patent Specification No. 1,496,522 and in published U.K Patent Application Nos. 2,015,220 and 8,036,839.

SUMMARY OF THE INVENTION

The present invention seeks to provide a keyboard operated speaking toy which is easy to operate and whose operation is readily learned by a child.

There is thus provided in accordance with an embodiment of the present invention, a toy including apparatus for producing a desired sequence of sounds and chordic keyboard apparatus for operating the producing apparatus.

Further in accordance with an embodiment of the invention, the chordic keyboard is a manually actuable keyboard.

Additionally in accordance with an embodiment of the invention the producing apparatus is operative to produce speech.

Further in accordance with an embodiment of the invention, the toy comprises an animate figure, such as a human, animal or fanciful character.

Additionally in accordance with an embodiment of the present invention, the toy comprises a voice synthesizer as the producing apparatus.

Further in accordance with an embodiment of the invention the toy also comprises logic circuitry which causes the toy to produce certain sounds in response to an interrogation inserted via the chordic keyboard.

Additionally in accordance with an embodiment of the present invention, the toy comprises means for supporting the toy in a position on supporting surface, in which position, the keyboard is accessible for manual actuation.

Further in accordance with an embodiment of the invention, the keyboard may be remote from the sound producing apparatus.

Further in accordance with an embodiment of the present invention, the operation of the toy may be controlled by logic circuitry which is selectably and changeably programmable. The program may be interchanged by inserting a program bearing element, such as a disk, casette, chip, or portion of magnetically encoded material.

Additionally in accordance with an embodiment of the invention, a walking and talking doll which may be remotely controlled is provided.

Further in accordance with an embodiment of the present invention a musical output is selectably provided by operation of the chordic keyboard. Shifting between different output functions, such as speech and music, for example, may be accomplished by encoding a shift code onto the chordic keyboard.

BRIEF DESCRIPTION OF THE DRAWINGS

The present invention will be more fully understood and appreciated from the following detailed description taken in conjunction with the drawings in which:

FIG. 4B is a schematic diagram of the circuitry shown, FIG. 4A.

DETAILED DESCRIPTION OF A PREFERRED EMBODIMENT

Figures 1, 3:
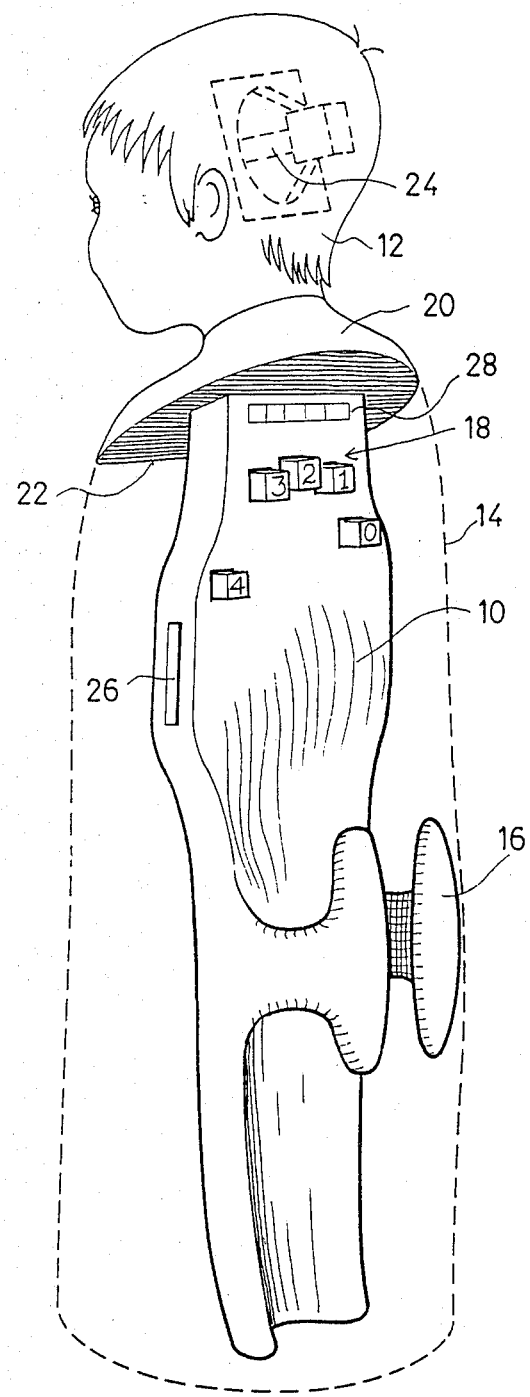
FIG. 1 is a pictorial illustration of a doll constructed and operative in accordance with a preferred embodiment of the present invention.
FIG. 3 is a code table for the doll of FIGS. 1 and 2.
Figure 2:
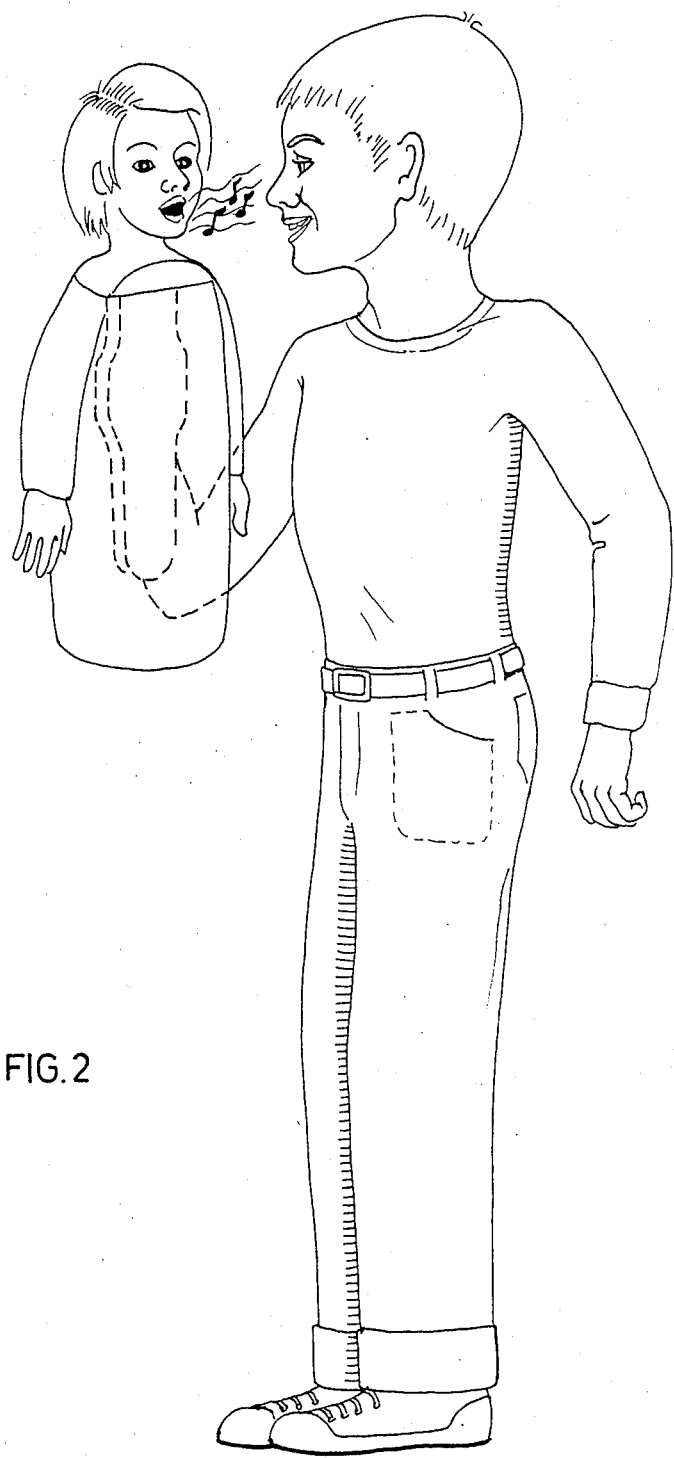
FIG. 2 is a pictorial illustration of the doll of FIG. 1 in use.

Reference is now made to FIGS. 1 and 2 which illustrate a doll constructed and operative in accordance with a preferred embodiment of the present invention. The doll comprises a body portion 10, a head portion 12 and a body covering 14. The body portion 10 is typically formed of molded plastic and is formed to define a wrist engaging support 16 which retains the body portion onto the wrist of the user while the user's fingers are free to engage a plurality of keys 18 mounted on the body portion. Keys 18 may be of conventional construction and comprise spring loaded switches which operate by downward movement. Alternatively keys 18 may define any other suitable type of finger actuated switch which may or may not have moving parts.

According to a preferred embodiment of the present invention, keys 18 are each identified by a different color. This color reference may be readily employed in learning cycles for associating various colors to various outputs, such as music or speech. Circuitry may be provided for illuminating the various keys 18 in a predetermined programmable sequence for teaching a user the sequence in a learning technique.

The top of the body portion 10 defines a shoulder portion 20 which is formed with a straight collar edge 22 facing in the opposite direction to the keys 18. Collar edge 22 defines a supporting surface for resting the doll thereon, when it is desired to play with the doll in a horizontal orientation and without engagement of the wrist engagement support. The head portion 12 is rotatable with respect to the shoulder portion 20 so that it may be turned to face the user, when the doll is being played with while resting on collar edge 22.

In accordance with a preferred embodiment of the present invention, the keys 18 define a chordic keyboard, which is characterized in that engagement of various combinations of keys 18 define predetermined outputs, such as musical notes, sounds, letters or words. The keys 18 are connected with logic circuitry (not shown) which is preferably located within the body portion 10. The logic circuitry may be connected in accordance with a preferred embodiment of the present invention with a voice synthesizer (not shown) which is operative to provide a speech output in response to predetermined electronic inputs. The speech output is provided to a speaker 24 which is preferably located in the head portion 12 adjacent the mouth of the doll defined thereby.

The logic circuitry and voice synthesizer employed in the doll of FIGS. 1 and 2 are described fully in FIG. 4 which will be referred to hereinafter.

According to an alternative embodiment of the invention, a voice synthesizer may not be used and instead a musical output may be provided by the logic circuitry in response to actuation of the keys 18. As a further alternative, both music and speech outputs may be provided. A singing output may also be provided.

According to a preferred embodiment of the invention, the logic circuitry may be programmable so as to provide a voice or singing output in any desired language or in a desired vocabulary. A program receiving slit 26 is provided in body portion 10 for receiving a replaceable program card or tape in a conventional manner employed in programmable calculators.

According to an embodiment of the invention, a display 28, such as a multidigit seven segment display, may be provided for indicating inputted information. Alternatively or additionally display 28 may display a learning program and indicate key combinations which provide predetermined letter sounds simultaneously with production of such sounds by the voice synthesizer.

Reference is now made to FIG. 3, which is a code table for use with the doll of FIG. 1 in selectable speaking or music modes. It is seen that the same finger code may be used for different functions, such as speech and music. Selection of the desired mode may be effected by imputting a predetermined selection code such as five consecutive letter P's, i.e. five consecutive engagements of all keys. Alternatively any other code may be used for this purpose. As a further alternative a separate function selection key or combination of keys may be employed.

Figure 4A:
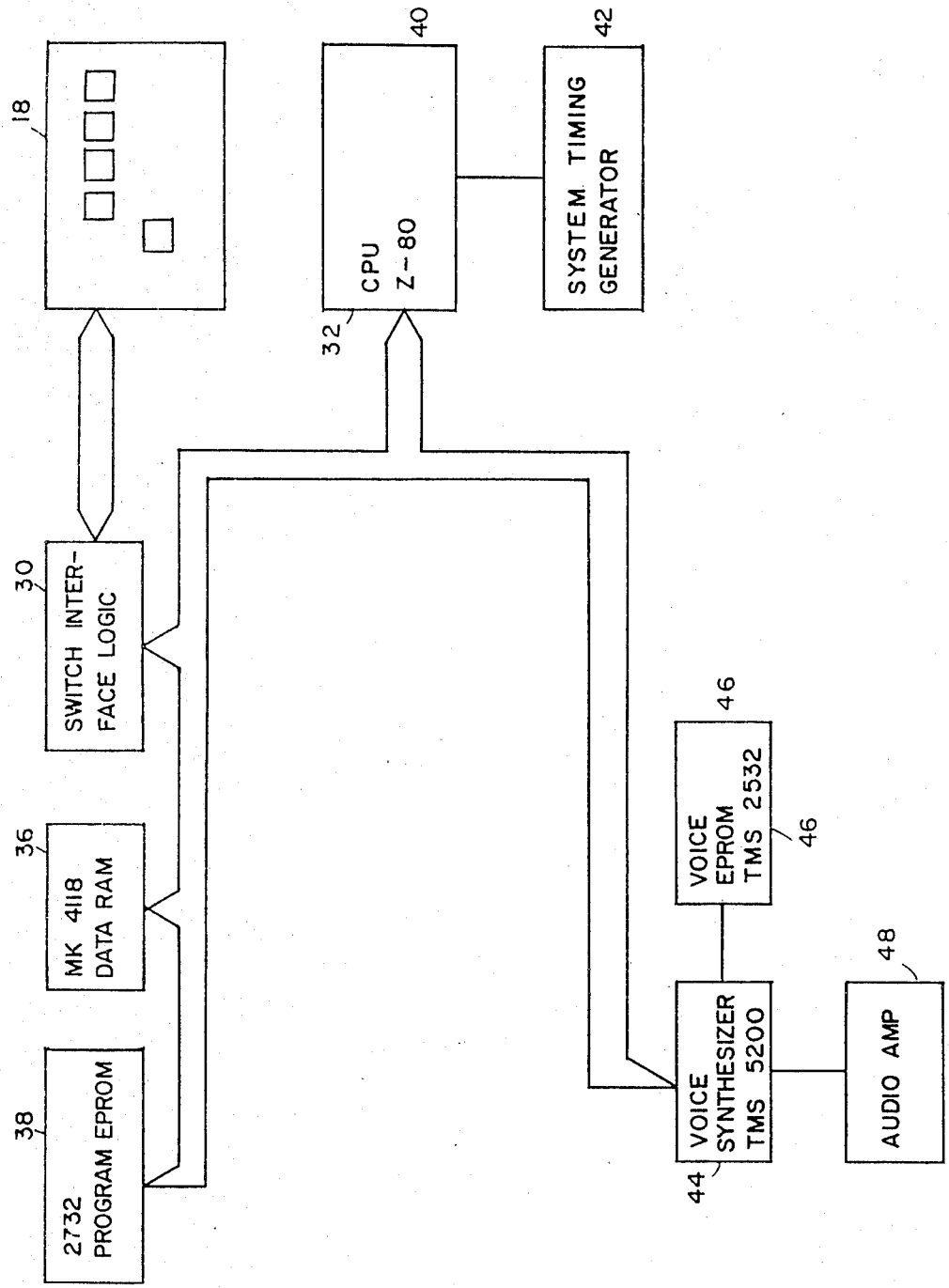
FIG. 4A is a diagram of the logic circuitry of the doll, FIGS. 1 and 2.

Reference is now made to FIG. 4A which is a diagram of the logic circuitry of the doll of FIGS. 1 and 2. The plurality of keys 18, defining an effective keyboard interfaces typically via electrical conducting wires with switch interface logic 30. Switch interface logic 30 communicates along a data bus 32 with a DATA RAM 36, such as an MK 4118 and with a program EPROM 38 such as a 2732. The interaction of these components is governed by a central processing unit 40, such as a Z-80 which interfaces with a system timing generator 42. The data bus 32 may be coupled to any suitable utilization circuitry. One example of such utilization circuitry which is employed in the embodiment of the embodiment of FIGS. 1 and 2 is a voice synthesizer 44 such as a TMS 5200 which is associated with a voice EPROM 46 such as a TMS 2532. The voice synthesizer outputs to an audio amplifier 48 which provides a sensible word output. It may be appreciated that any other suitable type of processing and output circuitry, such as circuitry for producing a musical output may alternatively be provided.

Reference is now made to FIG. 4B which is a schematic diagram of the circuitry illustrated in block diagram form in FIG. 4A. The schematic diagram is self explanatory and for the sake of conciseness will not be described textually herein.

Figure 5:
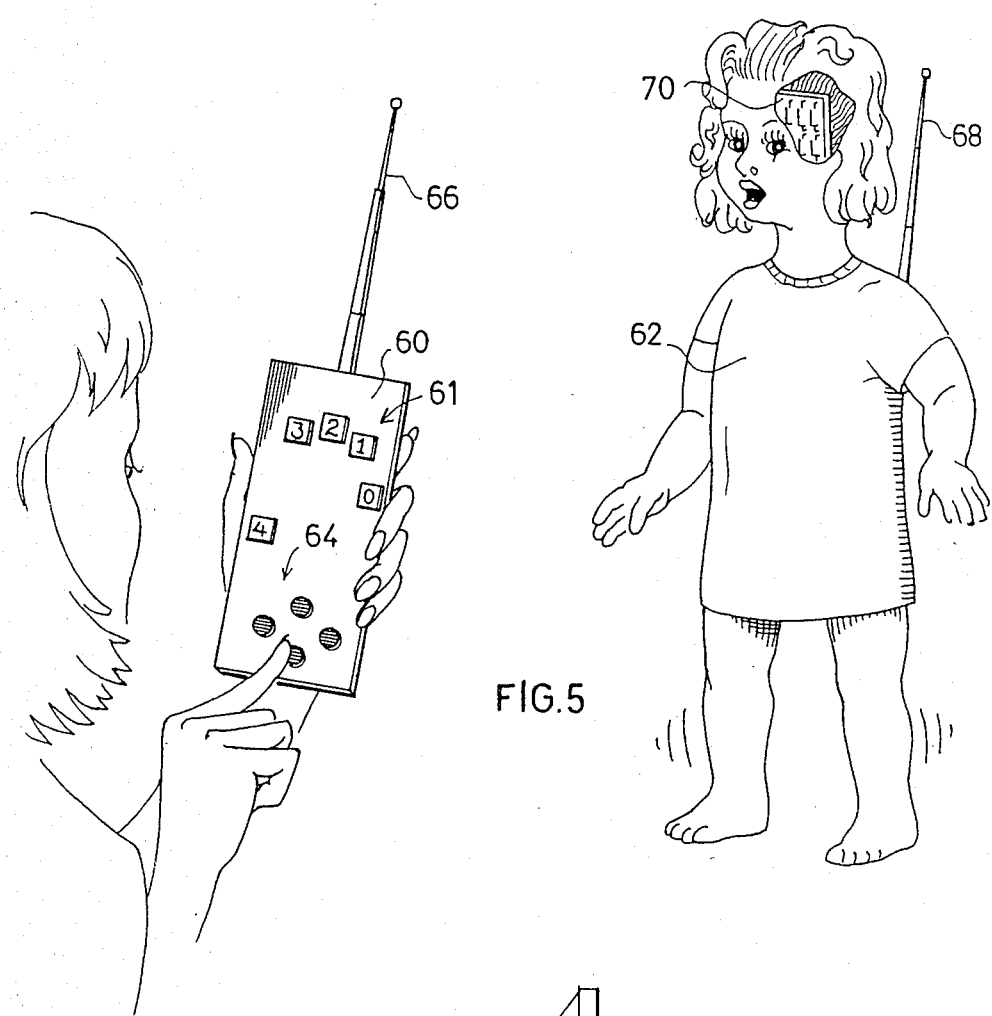
FIG. 5 is a pictorial illustration of remote controlled toy apparatus constructed and operative in accordance with an embodiment of the present invention.

Reference is now made to FIG. 5 which is a pictorial illustration of remote controlled toy apparatus constructed and operative in accordance with an embodiment of the present invention. In accordance with the embodiment of FIG. 5 a combination remote controlled walking and talking doll is provided. Remote controlled walking dolls are well known, one such doll being illustrated in the 1981 catalog of EPOCH, a Japanese toy manufacturer.

In the embodiment of FIG. 5, most of the electronic circuitry what was contained in the doll body portion in the embodiment of FIG. 1 and is contained in a remote unit 60. Remote unit 60 is connected to the doll 62 by means of a conventional radio link commonly used in toys and is provided with five push buttons 61, 0, 1, 2, 3 and 4 for speech actuation in a manner similar to that described in connection with FIGS. 1-3. The remote unit 60 may also be provided with additional control buttons 64 for governing the movement of the doll in accordance with conventional techniques and as used in conventional dolls. Alternatively, the additional control buttons 64 may be omitted and the movement controls may be provided by predetermined combinations of engagements with the five speech actuation push buttons 61.

Both the remote unit 60 and the doll 62 are provided with suitable antennas 66 and 68 respectively. The doll is provided with receiving circuitry 70 as well as a voice synthesizer and a loudspeaker for producing a desired voice and or other output.

Figure 6:
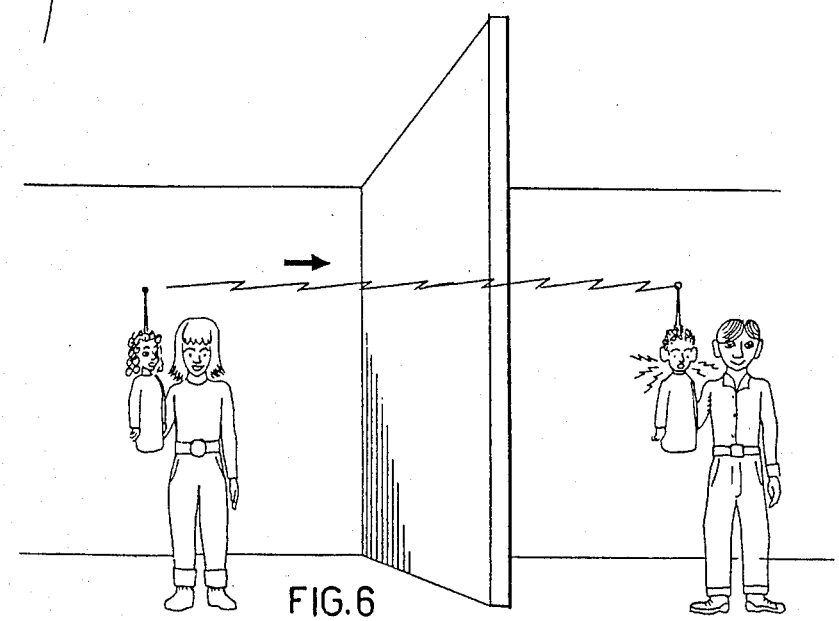
FIG. 6 is a pictorial illustration of intercommunicable toy apparatus constructed and operative in accordance with an embodiment of the present invention.

Reference is now made to FIG. 6 which illustrates intercommunicable toy apparatus constructed and operative in accordance with an embodiment of the present invention. In the illustrated embodiment two dolls, each having a general appearance similar to the dolls of FIGS. 1 and 2, are employed as communication devices. In distinction to the embodiments described hereinabove, however, the input inserted by each user is operative to actuate, via a radio link, the speech output of the other's doll. Thus communication between two users is possible, using the keyboard of each doll as an input device.

It is a particular feature of the present invention that the keyboards used are chordic keyboards, thus producing output indications in response to predetermined combinations of keyed inputs. An unlimited vocabulary may be inputted in this manner using only a very limited number of keys.

It may also be appreciated that the dolls described hereinabove may also be used as memory or message dolls. In such an embodiment, the dolls are provided with a suitable memory, in the form of a cassette tape disk or any other suitable memory and messages inputted on the keyboard are inserted into memory. The messages can be recalled and outputted via a speech synthesizer by actuation of an output code in the same keyboard. Entirely conventional circuitry may be used for this purpose.

It may also be appreciated that the present invention is not limited to dolls but may also be applied to any toy having an speech output. The input need not be necessarily in the form of a conventional keyboard. Instead, it may comprise any suitable input device which can be operated in a chordic mode.

It will be appreciated by persons skilled in the art that the invention is not limited to what has been particularly shown and described hereinabove. Rather the scope of the present invention is defined only by the claims which follow:

We claim:

1. A single hand held and operated toy comprising:
   a base;
   means for mounting said base onto the wrist of a user;
   means for producing a desired sequence of sounds; and
   chordic keyboard apparatus mounted onto said base and arranged to be operated by the fingers of the same hand of the user as the wrist onto which the base is mounted, said chordic keyboard apparatus being manually engageable in a selectable sequence for operating said producing means.

2. A toy according to claim 1 and wherein said chordic keyboard comprises a manually actuable keyboard.

3. A toy according to claim 1 and wherein said producing means is operative to produce speech.

4. A toy according to claim 3 and wherein said producing means comprises a voice synthesizer.

5. A toy according to claim 1 and wherein said producing means comprise logic circuitry and sound producing means, said logic circuitry being operative to cause said sound producing means to produce predetermined sounds in response to a coded input inserted via said chordic keyboard apparatus.

6. A toy according to claim 1 and also comprising memory means for storing an input supplied to it via said chordic keyboard apparatus.

7. A toy according to claim 5 and wherein said logic circuitry is selectably programmable to provide a selectable sound output.

8. A toy according to claim 1 and also comprising a radio link connecting said chordic keyboard apparatus to said means for producing a desired sequence of sounds, said chordic keyboard being located in a remote unit.

9. A toy according to claim 8 and wherein said toy comprises a movable toy, whose movements are governed by said remote unit.

10. A toy according to claim 9 and wherein said toy comprises a doll.

11. A toy according to claim 1 and comprising first and second units connected by a radio link, each of said units comprising producing means and chordic keyboard apparatus, said chordic keyboard of said first unit being operative to actuate said producing means of said second unit by means of said radio link.

12. A toy according to claim 1 and wherein said producing means is operated to produce music.

13. A toy according to claim 1 and also comprising a visual display for displaying inputted data.

14. A toy according to claim 1 and also comprising means for providing a preprogrammed combined audio and visual learning program.

15. A toy according to claim 14 and wherein said program providing means comprises means for illuminating predetermined keys on said keyboard apparatus simultaneously with the provision of a visual or audio output corresponding to actuation of such keys.

16. A single hand held and operated doll comprising:
    a body;
    means for mounting said body onto the wrist of a user;
    chordic data input means mounted onto said body and arranged to be operated by the fingers of the same hand of the user as the wrist onto which the body is mounted;
    logic circuitry operated by said chordic data input means; and
    a voice synthesizer operated by said logic circuitry for producing a speech output in response to manually inserted inputs at said chordic data input means.

* * * * *